United States Patent
Tompkins et al.

(10) Patent No.: US 10,209,738 B1
(45) Date of Patent: Feb. 19, 2019

(54) APPARATUS, SYSTEM, AND METHOD FOR ADJUSTING HEAD-MOUNTED-DISPLAY STRAPS

(71) Applicant: FACEBOOK TECHNOLOGIES, LLC, Menlo Park, CA (US)

(72) Inventors: Glen Jason Tompkins, Woodinville, WA (US); Joseph Patrick Sullivan, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/586,270

(22) Filed: May 4, 2017

(51) Int. Cl.
*G06F 1/00* (2006.01)
*G06F 1/16* (2006.01)
*A45F 5/00* (2006.01)

(52) U.S. Cl.
CPC ............... *G06F 1/163* (2013.01); *A45F 5/00* (2013.01); *G06F 1/1637* (2013.01)

(58) Field of Classification Search
CPC .......... G06F 1/163; G06F 1/1637; A45F 5/00
USPC ......................................................... 224/181
See application file for complete search history.

(56) References Cited

U.S. PATENT DOCUMENTS

| | | | | |
|---|---|---|---|---|
| 4,457,461 A * | 7/1984 | Docking | ................. | G12B 9/08 2/422 |
| 5,179,735 A * | 1/1993 | Thomanek | ............. | F16M 13/04 2/421 |
| 5,276,471 A * | 1/1994 | Yamauchi | .......... | G02B 27/0176 345/8 |
| 5,321,416 A * | 6/1994 | Bassett | .................. | A42B 3/145 345/8 |
| 5,469,578 A * | 11/1995 | Mattes | ................. | G02B 23/125 2/6.7 |
| 5,671,037 A * | 9/1997 | Ogasawara | ........ | G02B 27/0176 2/421 |
| 7,484,646 B1 * | 2/2009 | Holmes | ................... | B63C 11/12 2/422 |
| 8,814,691 B2 * | 8/2014 | Haddick | ............. | G02B 27/017 463/42 |
| 2006/0225187 A1 * | 10/2006 | Wu | ........................ | A42B 3/145 2/425 |

(Continued)

OTHER PUBLICATIONS

Peter Wesley Bristol et al.; Apparatus, System, and Method for Adjusting Head-Mounted-Display Straps; U.S. Appl. No. 15/582,566, filed Apr. 28, 2017.

(Continued)

*Primary Examiner* — Peter Helvey
(74) *Attorney, Agent, or Firm* — FisherBroyles, LLP

(57) ABSTRACT

A head-mounted-display adjustment apparatus may include a spring with a restoring force that is, within an elastic limit of the spring, substantially disproportional to deflection of the spring. The adjustment apparatus may also include a mount that couples the spring to a head-mounted display. In addition, the adjustment apparatus may include a strap with a distal section coupled to the head-mounted display and a proximal section coupled to the spring such that (1) the strap is extendable, via deflection of the spring, away from the head-mounted display and (2) when a user is wearing the head-mounted display, the restoring force of the spring holds, via the strap, the head-mounted display against the user's face. Various other head-mounted-display adjustment devices, systems, and methods are also disclosed.

16 Claims, 16 Drawing Sheets

(56) References Cited

U.S. PATENT DOCUMENTS

| | | | |
|---|---|---|---|
| 2010/0327028 A1* | 12/2010 | Nakabayashi | A42B 1/247 224/162 |
| 2011/0127305 A1* | 6/2011 | Yates | G02B 7/002 224/181 |
| 2012/0280007 A1* | 11/2012 | Nakabayashi | G02B 27/0176 224/181 |
| 2013/0327909 A1* | 12/2013 | Freelander | A45F 5/00 248/224.7 |
| 2016/0299346 A1 | 10/2016 | Allin et al. | |
| 2016/0363768 A1 | 12/2016 | Drinkwater et al. | |
| 2016/0363996 A1 | 12/2016 | Higgins et al. | |
| 2016/0366503 A1 | 12/2016 | Miller et al. | |

OTHER PUBLICATIONS

Joseph Patrick Sullivan; Apparatus, System, and Method for Adjusting Head-Mounted-Display Straps, U.S. Appl. No. 15/615,775, filed Jun. 6, 2017.

Glen Jason Tompkins et al.; Apparatus, System, and Method for Adjusting Head-Mounted-Display Straps; U.S. Appl. No. 15/600,348, filed May 19, 2017.

\* cited by examiner

US 10,209,738 B1

APPARATUS, SYSTEM, AND METHOD FOR ADJUSTING HEAD-MOUNTED-DISPLAY STRAPS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

In any use of a virtual reality headset, making the experience as immersive as possible may be critical. Regrettably, a variety of factors may disrupt virtual-reality immersion, and one of the most significant disruptions to having an immersive experience may be an ill-fitting headset. Since many headsets may be relatively heavy with most of their weight distributed toward the front, a poor fit may result in significant pressure on a user's face, leading to discomfort that may make a virtual reality experience less compelling.

Traditional virtual reality headsets may provide some limited options for addressing a poor fit, but these options may be sub-optimal. For example, adjusting a traditional headset for comfortable facial pressure and proper size may involve making numerous manual changes over several fitting attempts. This process may be surprisingly time-consuming, and for some users, finding a good fit may be quite difficult. The problem of achieving a good fit may be exacerbated for headsets that are used by multiple people, which may necessitate a refitting before each use. And finding a good fit isn't the only problem with using virtual reality headsets—the configuration of some traditional headset straps may result in awkward, uncomfortable, or comical attempts at putting on or removing headsets.

SUMMARY

As will be described in greater detail below, the instant disclosure generally relates to head-mounted-display strap devices, systems, and methods. In some embodiments, a head-mounted-display adjustment apparatus may include a spring with a restoring force that is, within an elastic limit of the spring, substantially disproportional to deflection of the spring. The apparatus may also include a mount that couples the spring to a head-mounted display. In addition to the mount, the apparatus may include a strap with a distal section coupled to the head-mounted display and a proximal section coupled to the spring such that (1) the strap is extendable, via deflection of the spring, away from the head-mounted display and (2) when a user is wearing the head-mounted display, the restoring force of the spring holds, via the strap, the head-mounted display against the user's face.

In some examples, the restoring force of the spring may be constant or approximately constant over a working deflection of the spring. Additionally or alternatively, the spring may include a ribbon with a rolled portion and an a protracted section that extends from the rolled portion, and the mount may include a telescoping assembly with a track that is connected to the head-mounted display and a slide that moves along the track and is connected to the proximal section of the strap. In this example, the protracted section of the ribbon may be anchored to the slide and the rolled portion of the ribbon may be housed by the track such that, when the slide moves along the track and away from the head-mounted display, the ribbon unrolls and the strap extends away from the head-mounted display.

The apparatus may also include an actuator that controls resistance to the deflection of the spring, and the actuator may be configured in a variety of ways. For example, the actuator may include a disk that, when rotated, adjusts the resistance to the deflection of the spring. In this example, the actuator may also include a knob and a cam that couples the knob to the disk in an eccentric manner such that lateral movement of the knob rotates the disk. Additionally or alternatively, the actuator may include a graspable arm extending from and coupled to a circumference of the disk such that the graspable arm, when rotated toward or away from the head-mounted display, rotates the disk.

According to some embodiments, the actuator may be coupled to a brake assembly. In these embodiments, the disk of the actuator may be dimensioned to, when in a first rotary position, cause the brake assembly to increase the resistance to the deflection of the spring. The disk may also be dimensioned to, when in a second rotary position, cause the brake assembly to decrease the resistance to the deflection of the spring.

The brake assembly may be configured in any suitable way. For example, the brake assembly may include a brake positioned to apply pressure to the spring in a manner that creates the resistance to the deflection of the spring. The brake assembly may also include a spring-loaded shaft having a proximal end coupled to the disk (e.g., via a bearing) and a distal end coupled to the brake. In such examples, a circumference of the disk may include an arc section and a recessed section. When the disk is in the first rotary position, the arc section of the disk may push the shaft toward the spring and may cause the brake assembly to increase the resistance to the deflection of the spring. When the disk is in the second rotary position, the recessed section of the disk may allow the shaft to move away from the spring and may cause the brake assembly to decrease the resistance to the deflection of the spring.

According to various embodiments, a corresponding head-mounted-display system may include a spring with a restoring force that is, within an elastic limit of the spring, substantially disproportional to deflection of the spring. The system may also include a head-mounted display and a mount that couples the spring to the head-mounted display. In addition, the system may include a strap with a distal section coupled to the head-mounted display and a proximal section coupled to the spring such that (1) the strap is extendable, via deflection of the spring, away from the head-mounted display and (2) when a user is wearing the head-mounted display, a restoring force of the spring holds, via the strap, the head-mounted display against the user's face.

The system may include more than one strap-adjustment spring, as shown in various embodiments herein. For example, the distal section of the strap may be coupled to the head-mounted display via an additional mount that couples an additional spring to the head-mounted display. The spring and the additional spring may be constant-force springs, and a tension of the spring may at least approximate a tension of the additional spring.

According to some embodiments, the system may include spring adjustment mechanisms on either side of a head-mounted display, on top of a head-mounted display, or any combination thereof. For example, the mount that couples the spring to the head-mounted display may be connected to a first section of the head-mounted display and may be dimensioned to be positioned at a left side of a user's head. Similarly, the additional mount that couples the additional spring to the head-mounted display may be connected to a second section of the head-mounted display that is dimensioned to be positioned at a right side of the user's head. In some examples, the strap may also include a medial section coupled to a third section of the head-mounted display, and the medial section may be dimensioned to be positioned at a user's forehead.

In some examples, the mount that couples the spring to the head-mounted display may include a telescoping assembly, which may have a track that is connected to the head-mounted display and a slide that moves along the track and is connected to the proximal section of the strap. Additionally or alternatively, the spring may include a ribbon having a rolled portion and a protracted section that extends from the rolled portion, and the protracted section of the ribbon may be anchored to the slide. In this example, the rolled portion of the ribbon may be housed by the track such that, when the slide moves along the track and away from the head-mounted display, the ribbon unrolls and the strap extends away from the head-mounted display.

The mounts that couple the springs to the head-mounted display may, as described in the instant disclosure, include a variety of adjustment mechanisms. For example, a mount may include a disk that, when rotated, adjusts resistance to the deflection of the spring. The mount may also include a knob and a cam that couples the knob to the disk in an eccentric manner such that rotation of the disk causes lateral movement of the knob. Additionally or alternatively, the mount may include a telescoping assembly having a track that is connected to the head-mounted display and a slide that moves along the track and is connected to the proximal section of the strap.

In addition to the various systems and devices described herein, the instant disclosure presents exemplary methods associated with head-mounted-display strap systems. For example, a method may include securing, to a head-mounted display, a spring with a restoring force that is, within an elastic limit of the spring, substantially disproportional to deflection of the spring. The method may also include coupling a distal section of a strap to the head-mounted display and coupling a proximal section of the strap to the spring such that (1) the strap is extendable, via deflection of the spring, away from the head-mounted display and (2) when a user is wearing the head-mounted display, a restoring force of the spring holds, via the strap, the head-mounted display against the user's face.

In examples where the spring comprises a ribbon having a rolled portion and a protracted section that extends from the rolled portion, securing the spring to the head-mounted display may involve (1) mounting a track to the head-mounted display, (2) coupling a slide to the track such that the slide moves along the track, and (3) anchoring the protracted section of the ribbon to the slide. In such examples, coupling the distal section of the strap to the head-mounted display may include connecting the slide to the proximal section of the strap, and coupling the proximal section of the strap to the spring may include securing the rolled portion of the ribbon to the track such that, when the slide moves along the track and away from the head-mounted display, the ribbon unrolls and the strap extends away from the head-mounted display.

Continuing with the previous example, the method may also include (1) coupling, to the track, a disk that when rotated adjusts the resistance to the deflection of the spring, and (2) using a cam to eccentrically couple a knob to the disk such rotation the disk causes lateral movement of the knob. In this example, the method may also include coupling a graspable arm to the knob such that rotational movement of the graspable arm corresponds to the lateral movement of the knob.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate examples of apparatuses, systems, and methods according to various embodiments described herein. These drawings are a part of the specification and, together with the following description, demonstrate and explain various principles of the instant disclosure. Throughout the drawings, identical reference characters and descriptions indicate similar, but not necessarily identical, elements.

Figure 1:
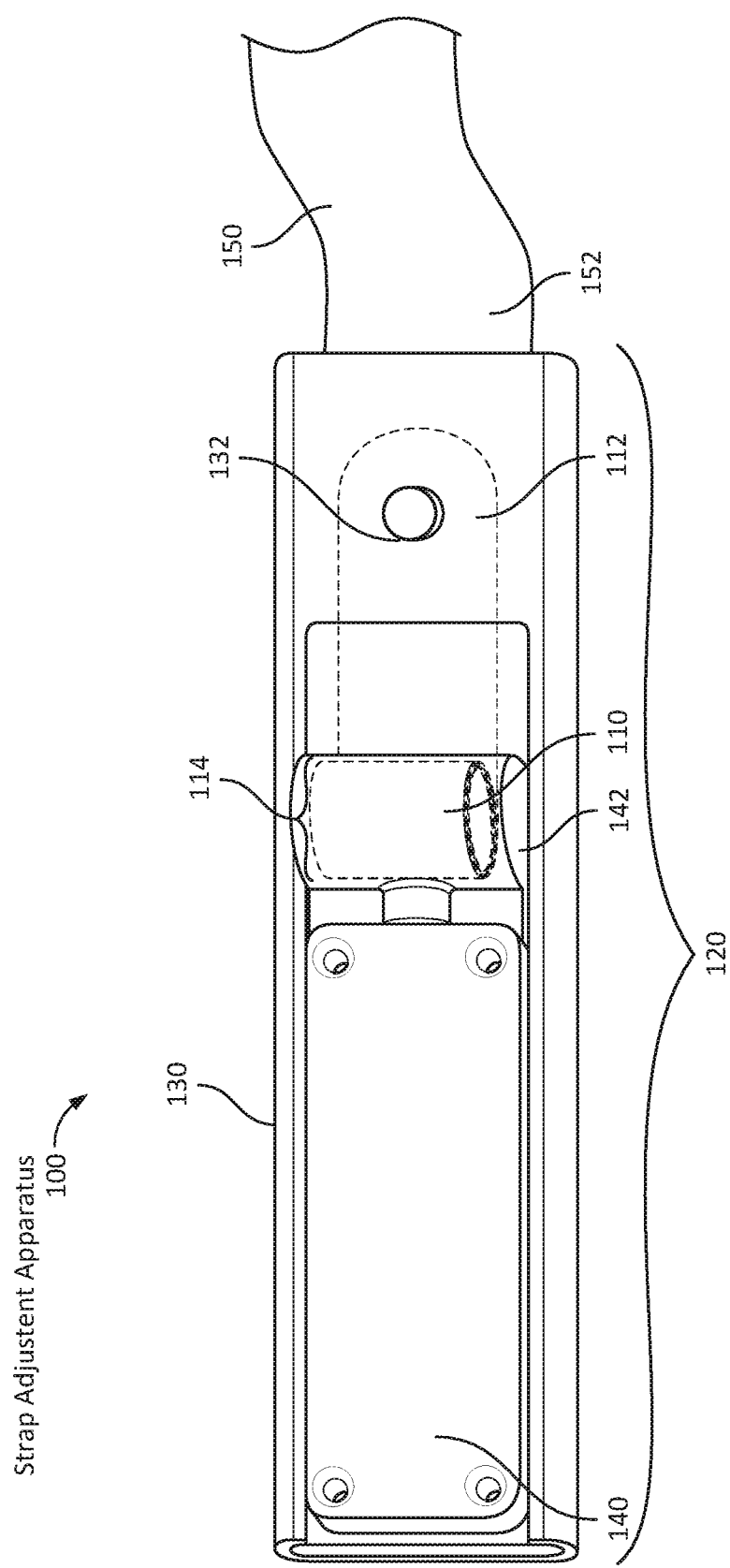
FIG. 1 is a side view of a strap-adjustment apparatus coupled to a strap of a head-mounted display.

While the exemplary embodiments described herein are susceptible to various modifications and alternative forms, specific embodiments have been shown by way of example in the drawings and will be described in detail herein. However, the elements, configurations, and steps shown in the drawings are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The disclosure provided herein describes and illustrates numerous exemplary spring mechanisms for adjusting head-mounted-display straps. These spring mechanisms may be extensibly connected to a head-mounted display and coupled to a strap that holds the head-mounted display against a user's head. The spring systems disclosed herein may also provide various features and advantages over conventional strap systems by incorporating at least one non-Hooke's-law spring (i.e., a spring whose restoring force is substantially disproportional to its deflection). For example, since the force required to extend a non-Hooke's-law spring may not significantly increase over its working displacement, adjusting a strap mechanism that is loaded with a non-Hooke's-law spring may be easier than adjusting a strap mechanism that is loaded with a traditional extension spring.

Embodiments of the instant disclosure may also include various strap-fitting elements that make micro adjustments to the extension of a strap, lock the movement of a spring, adjust a spring's resistance to displacement, and/or change the tension of a spring. For example, an eccentric actuation assembly may enable making micro adjustments to a straps fit and/or may trigger a spring-adjustment mechanism to lock-in micro adjustments of a strap's fit. As discussed in greater detail below, these and other disclosed embodiments, whether used alone or in combination, may help optimize the immersiveness, enjoyability, and/or utility of a virtual- or augmented-reality experience.

The following will provide, with reference to FIGS. 1 and 3-8, examples of devices for adjusting head-mounted-display systems. In addition, the discussion associated with FIGS. 2 and 9-13 will provide examples of head-mounted-display systems that include the devices illustrated in FIGS. 1 and 3-8. Finally, the discussion corresponding to FIGS. 14-16 will provide examples of methods for manufacturing, assembling, configuring, and/or using the head-mounted-display adjustment mechanisms presented herein.

FIG. 1 illustrates an apparatus 100 for adjusting a head-mounted-display strap. Apparatus 100 may include a spring 110 with a restoring force that is, within an elastic limit of spring 110, substantially disproportional to deflection of spring 110. The term "elastic limit," as used herein, generally refers to the maximum extent or distance that a spring may be stretched without permanent alternation. In other words, the elastic limit may be the maximum deflection of a spring in which the spring will retain its original length after force is withdrawn.

The term "deflection," as used herein, generally refers to the movement or displacement of a spring, either by applying or removing force from it. The term "restoring force," as used herein, generally refers to any force that acts to restore a spring to equilibrium or rest. Thus, the restoring force of a spring could be said to act in opposition to any displacement of the spring.

As noted, a spring whose restoring force is substantially disproportional to its deflection may be any spring that does not follow or approximately follow (i.e., within generally accepted manufacturing tolerances) Hooke's law. Hooke's law states that a deformation of an elastic object (e.g., a spring) is proportional to the stress applied to it, and traditional compression and expansion springs are examples of springs that generally obey Hooke's law.

Spring 110 may include any type or form of elastic device that does not obey Hooke's law. For example, spring 110 may be a constant-force spring that maintains uniform or near-uniform (i.e., within generally accepted manufacturing tolerances) force exertion over a range of working deflection. In other words, spring 110 may exert at least approximately constant (i.e., near-constant to constant) force over a working deflection of spring 110. Alternatively, spring 110 may exert force that, while not being constant, is not generally proportional to displacement of spring 110.

Spring 110 may be configured in any fashion that causes spring 110 to function in a manner that ignores Hooke's law. For example, spring 110 may be constructed as a rolled ribbon of spring steel or any other pre-stressed material that is relaxed when fully rolled up. In other words, spring 110 may be a straight, thin-walled strip of resilient material with a curved cross-section. In these types of springs, which may be referred to as constant-force springs, tape springs, or clock springs, the restoring force may primarily be a result of an extended portion of the ribbon that is nearest to the roll. The restoring force is nearly constant in springs made from rolled ribbon because the geometry of the portion of the spring that creates the restoring force remains nearly constant as the spring unrolls.

Spring 110 may apply any amount of force that comfortably and/or securely holds a head-mounted display against a user's face. In some embodiments, spring 110 may, alone or in combination with one or more additional springs coupled to a strap 150, cause a head-mounted display to be pulled against a user's face with approximately 4-6 newtons of force. Furthermore, as discussed in greater detail below, a user may adjust spring 110 to cause a head-mounted display to apply more or less force than a default force (e.g., approximately 5 newtons) caused by spring 110.

Spring 110 may also be dimensioned in any manner that is suitable for use in the embodiments disclosed herein. For example, spring 110 may be dimensioned to enable various amounts of displacement or extension of strap 150. In some embodiments, spring 110 may enable up to approximately 80 mm of extension for strap 150. In such embodiments, spring 110 may be at least 80 millimeters long. In other embodiments, spring 110 may be shorter or longer than 80 millimeters and may enable strap 150 to extend less than 80 millimeters (e.g., 40, 50, 60, or 70 millimeters) or more than 80 millimeters (e.g., 90, 100, 110, or 120 millimeters). In some configurations, the longer spring 110 is, the more ability strap 150 may have to extend and accommodate different shapes and sizes of user's heads.

Spring 110 may also be any suitable width or thickness. For example, spring 110 may be less than a width of a head-mounted-display strap (e.g., less than approximately 15-50 millimeters). In other embodiments, spring 110 may be wider than a head-mounted-display strap but narrower than a height of a head-mounted display. Additionally or alternatively, spring 110 may have an asymmetrical cross-section with a width dimension that is greater than a thickness dimension.

Returning to strap-adjustment apparatus 100 of FIG. 1, spring 110 may be coupled to a mount 120. Mount 120 may connect spring 110 to a head-mounted display and may be configured in a variety of ways. For example, mount 120 may include a track 140 and a slide 130 that moves along track 140. In the example shown in FIG. 1, track 140 may slide to the left along slide 130. In other examples, slide 130 may be positioned within track 140. Furthermore, while FIG. 1 illustrates mount 120 as a tubular telescoping assembly, mount 120 may be configured in any other shape (e.g., squared or angular) using any other mechanical linkage mechanism (e.g., a rotary mechanism, a four-bar linkage mechanism, a slider-crank mechanism, a rotating cam mechanism, a geared mechanism, etc.). The term "telescoping assembly," as used herein, generally refers to a coupling of elements (e.g., concentric tubular parts) in which the elements are movably attached to each other in a manner that enables the telescoping assembly to shorten and lengthen.

Spring 110 may be coupled to mount 120 in a variety of ways. As shown in FIG. 1, a protracted section 112 of spring 110 may be attached to a post 132 of slide 130. In this example, a hole or opening in protracted section 112 of spring 110 may be situated over post 132 to hold protracted section 112 of spring 110 in place on slide 130. Thus, protracted section 112 of spring 110 may be stationary relative to slide 130. Protracted section 112 of spring 110 may also be directly or indirectly anchored to slide 130 using any other suitable coupling mechanism.

FIG. 1 also shows that a rolled portion 114 of spring 110 may be positioned within a housing 142 of track 140 in a manner that couples spring 110 to strap 150. Thus, when slide 130 extends relative to track 140 (i.e., away from a head-mounted display), spring 110 may unroll and strap 150 may extend away from the head-mounted display. In other words, strap 150 may be extendable, via deflection of spring 110, away from the head-mounted display. Furthermore, when a user is wearing the head-mounted display, a restoring force of spring 110 may hold, via strap 150, the head-mounted display against the user's face.

Figure 2:
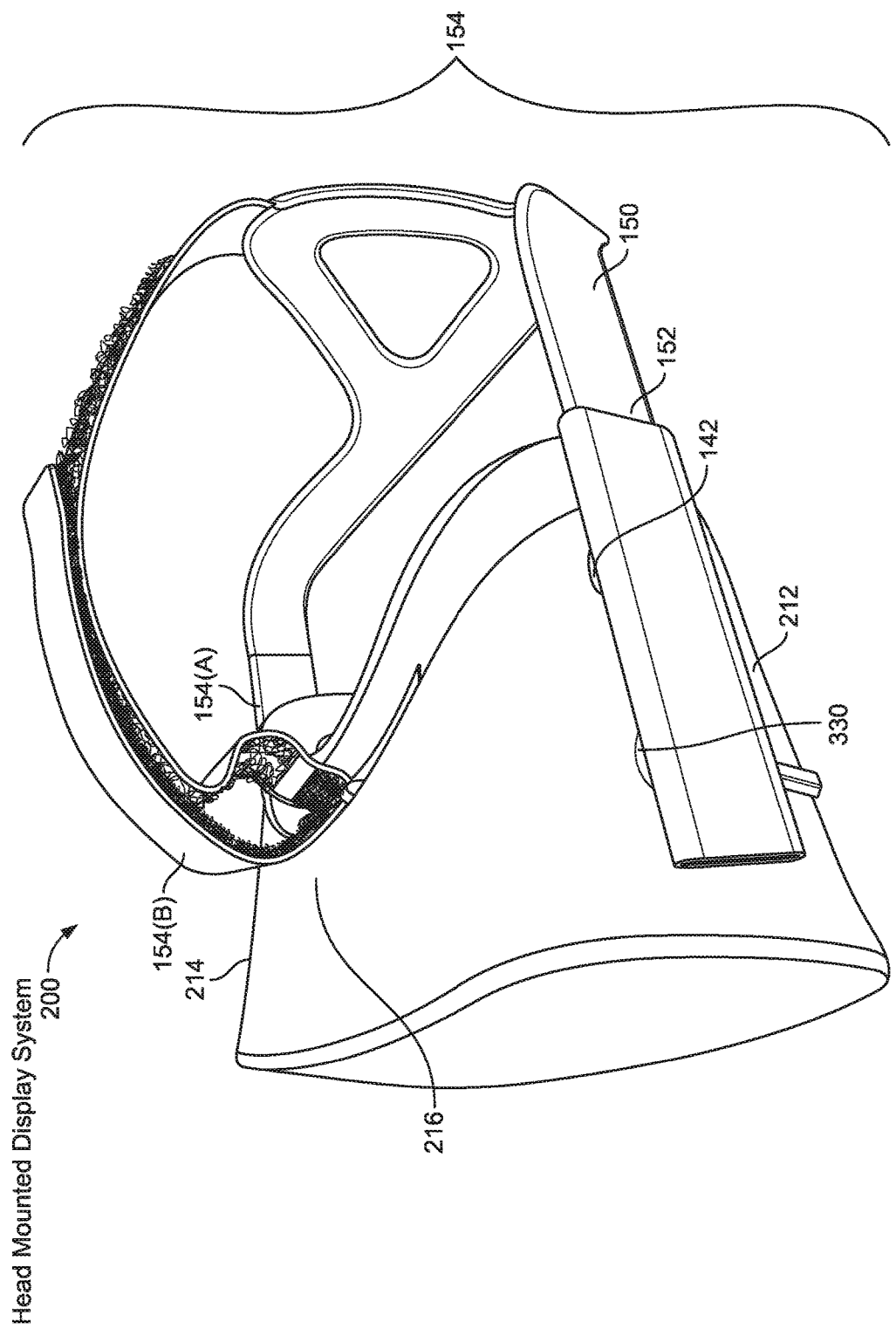
FIG. 2 is a perspective view of a system with a strap-adjustment apparatus coupled to a head-mounted display.

FIG. 2 is a perspective view of a head-mounted-display system 200 with strap-adjustment apparatus 100 coupled to a head-mounted display 210. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

As shown in FIGS. 1 and 2, a proximal section 152 of a strap 150 may be coupled to spring 110. The term "strap," as used herein, generally refers any strip of material (plastic, leather, cloth, woven, etc.) used to fasten, secure, or otherwise couple one object (e.g., a head-mounted display) to another (e.g., a user's head). The straps discussed in the present disclosure may be of any suitable shape, size, flexibility, or elasticity (e.g., stretchable or non-stretchable).

Strap 150 may be coupled to spring 110 either directly or indirectly. The example in FIG. 1 illustrates an indirect coupling of strap 150 to spring 110 with proximal section 152 of strap 150 attached to slide 130, and with spring 110 being housed within housing 142 of track 140. In other examples, strap 150 may be coupled to spring 110 by being formed or manufactured as an integral part of spring 110 or slide 130. Strap 150 may also be coupled to spring 110 in any other suitable manner.

Proximal section 152 of strap 150 may be coupled to a side portion 212 (e.g., a left-hand side) of head-mounted display 210. Similarly, a distal section 154 of strap 150 may also be attached to head-mounted display 210, as shown in FIG. 2 and discussed in greater detail in the disclosure corresponding to FIGS. 9-13. Distal section 154 of strap 150 may include a side section 154(A) coupled to a side portion 214 (e.g., a right-hand side) of head-mounted display 210. Distal section 154 of strap 150 may also include a top section 154(B) coupled to a top portion 216 of head-mounted display 210.

When putting on head-mounted-display system 200 or taking off head-mounted-display system 200, strap-adjustment apparatus 100 may enable a user to make macro adjustments for fitting head-mounted display 210 to the user's head. Macro adjustments may extend a strap within a range of approximately 1 mm (or less) to approximately 80 mm (or more) and may size head-mounted-display system 200 to accommodate heads of various shapes and sizes.

As noted, strap-adjustment apparatus 100 may include a non-Hooke's-law spring. Non-Hooke's-law spring systems may provide one or more advantages over traditional adjustment devices when making macro adjustments to the fit of a head-mounted display. For example, a non-Hook's-law spring system may provide smooth, even resistance to strap extension as a user pulls the strap away from a head-mounted display to put on or remove the head-mounted display. In contrast, adjustment mechanisms that use traditional extension springs may become increasingly difficult to adjust as a strap is pulled away from a head-mounted display.

As another example of a potential advantage of strap-adjustment apparatus 100, a non-Hook's-law spring system may, regardless of the size or shape of a user's head, pull a head-mounted display against the user's face with approximately the same force. Traditional spring fitting mechanisms, on the other hand, may exert more force on a user with a relatively large head (which may lead to discomfort) and less force on a user with a relatively small head (which may result in a loose fit).

In addition to facilitating macro adjustments of head-mounted-display systems, embodiments of the instant disclosure may provide for micro adjustments of head-mounted-display systems. Micro adjustments may include fine tweaking to the pressure or fit of a head-mounted-display system. In some embodiments, micro-adjustments may be made while a user is wearing a head-mounted display, thus precluding the need to take off the head-mounted display when making fitting alterations.

Figure 3:
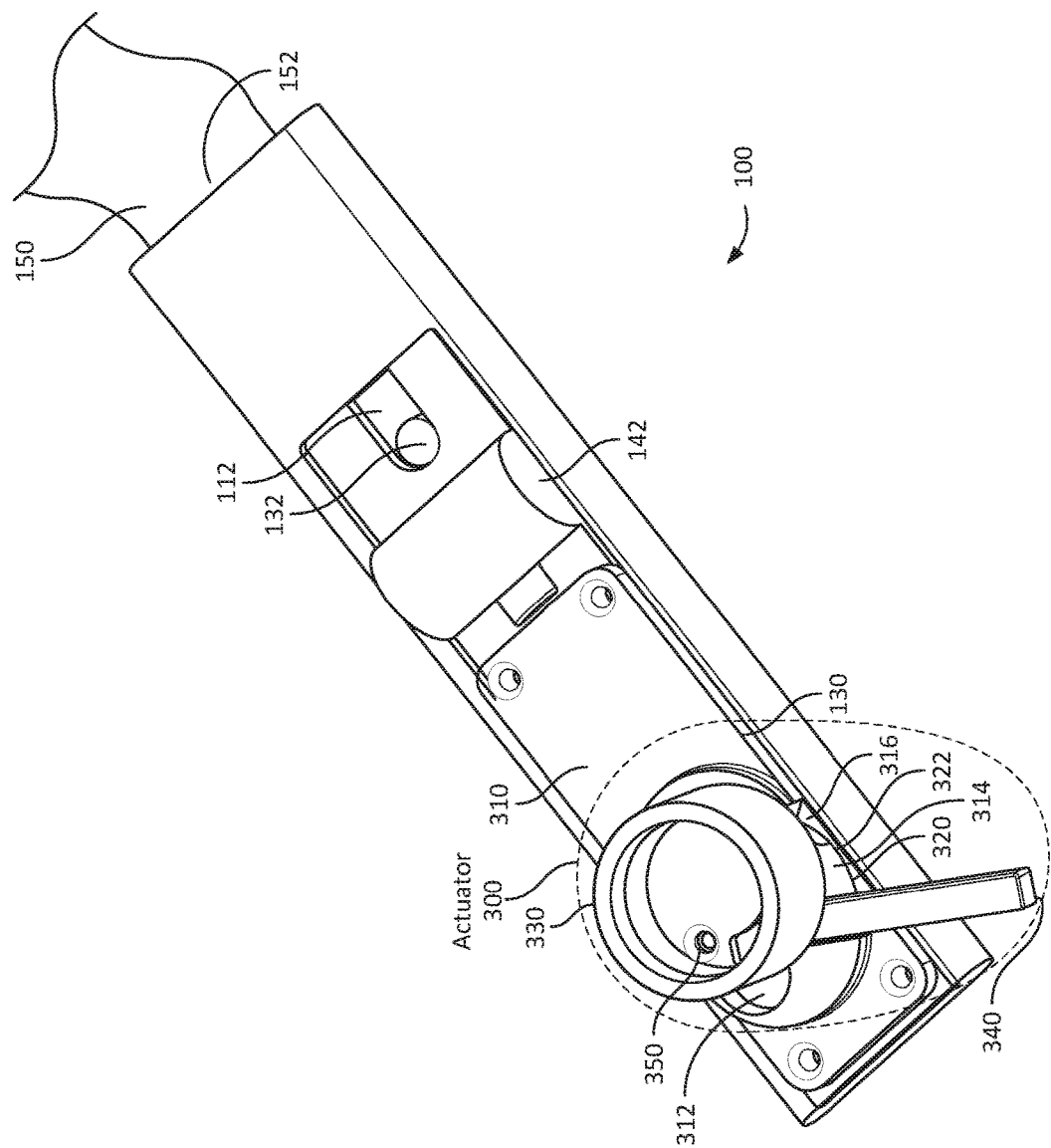
FIG. 3 is a perspective view of a strap-adjustment apparatus that includes a micro-adjustment assembly.

FIG. 3 shows an example of a micro-adjustment actuator 300 coupled to strap-adjustment apparatus 100. Micro-adjustment actuator 300 may control spring 110's resistance to deflection and may include a base 310 fitted with a rotatable disk 320. When turned or rotated, rotatable disk 320 may adjust spring 110's resistance to displacement in one or more ways. For example, rotatable disk 320 may, via a gearing mechanism, increase or decrease a tension of spring 110 (e.g., by causing spring 110 to be rolled more tightly or more loosely). As another example, rotatable disk 320 may, as discussed in greater detail in connection with FIGS. 5-8, actuate a braking mechanism that puts pressure on spring 110 and prevents or resists protraction of an extended end of spring 110.

FIG. 3 also shows that rotatable disk 320 may be coupled to a knob 330 and/or a graspable arm 340. As used herein, the term "graspable" generally refers to an element being shaped, dimensioned, sized, and/or otherwise configured in a manner that enables the element to be engaged, moved, or clasped by human fingers and/or thumbs. Knob 330 may be coupled to rotatable disk 320 via a cam 350 that moves through an aperture 312 in base 310, as shown in FIGS. 3-6. Cam 350 may couple rotatable disk 320 to knob 330 in an eccentric manner that enables lateral movement of knob 330 (i.e., movement of knob 330 along a length of aperture 312) when disk 320 rotates.

Knob 330 may couple track 140 to head-mounted display 210, as shown in FIG. 2. In this configuration, when disk 320 rotates, knob 330 may move forward or backward relative to the rest of track 140, which may move head-mounted display 210 backward or forward relative to track 140 and may, as discussed in greater detail below, enable micro-adjustments to a fit of head-mounted display 210.

Figure 4:
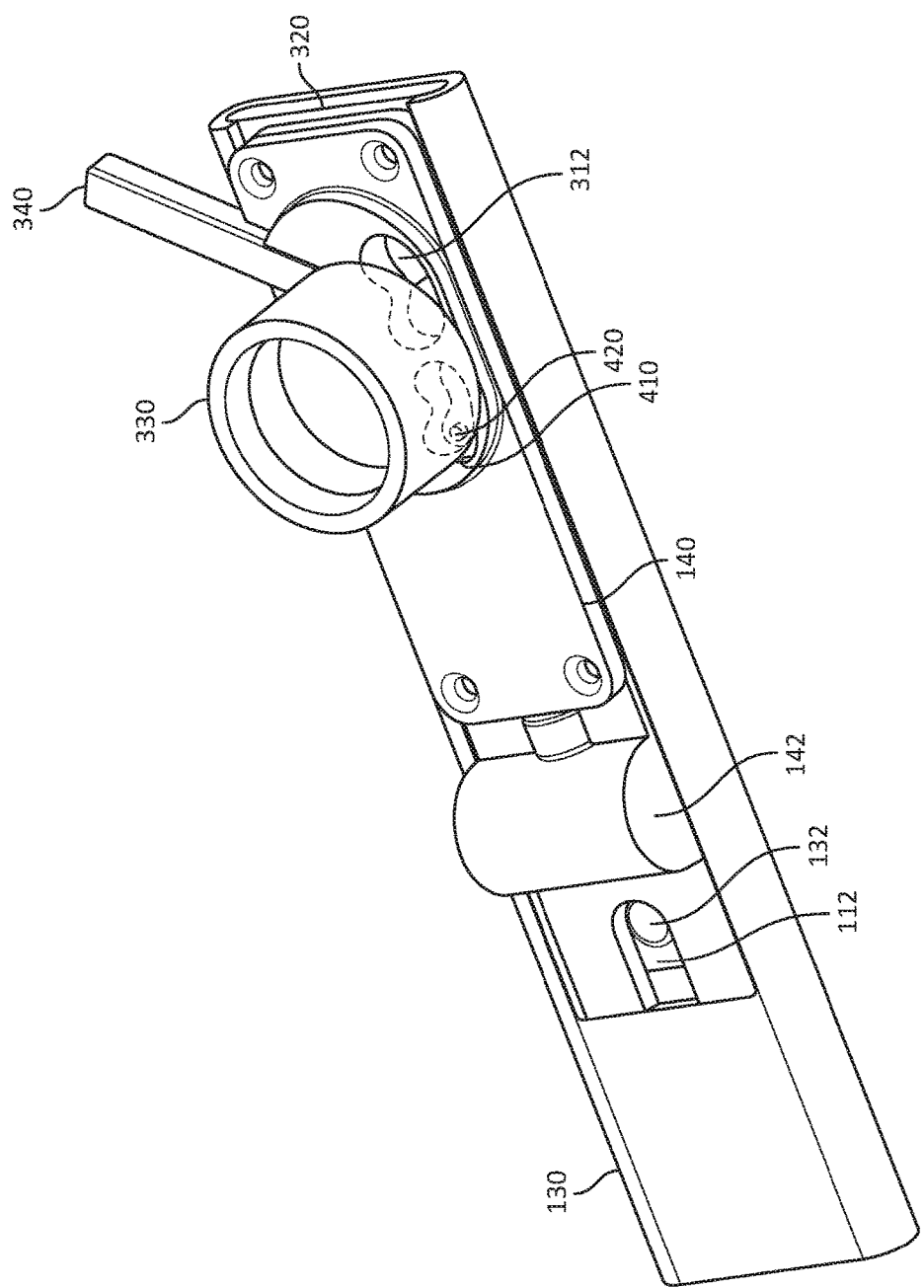
FIG. 4 is an alternative view of the strap-adjustment apparatus shown in FIG. 3.
Figure 5:
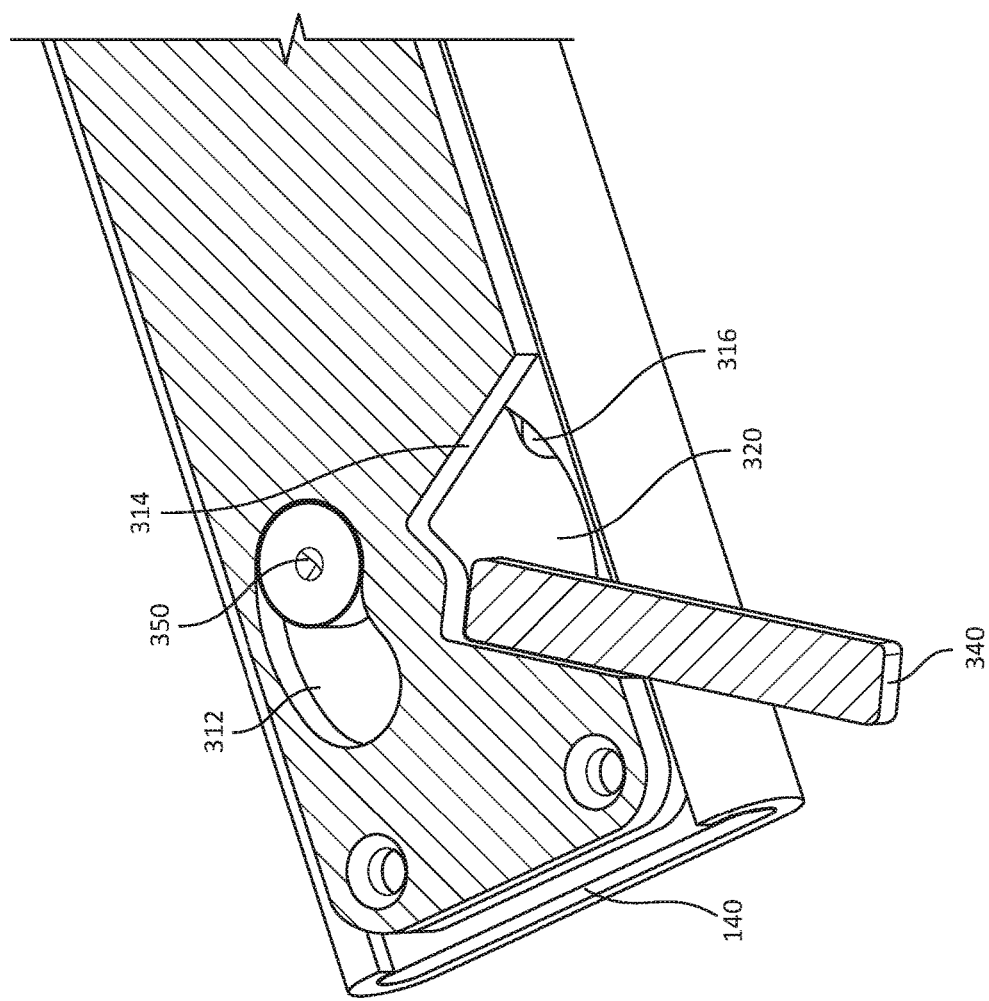
FIG. 5 is a cross-sectional view the micro-adjustment apparatus illustrated in FIGS. 3 and 4.
Figure 6:
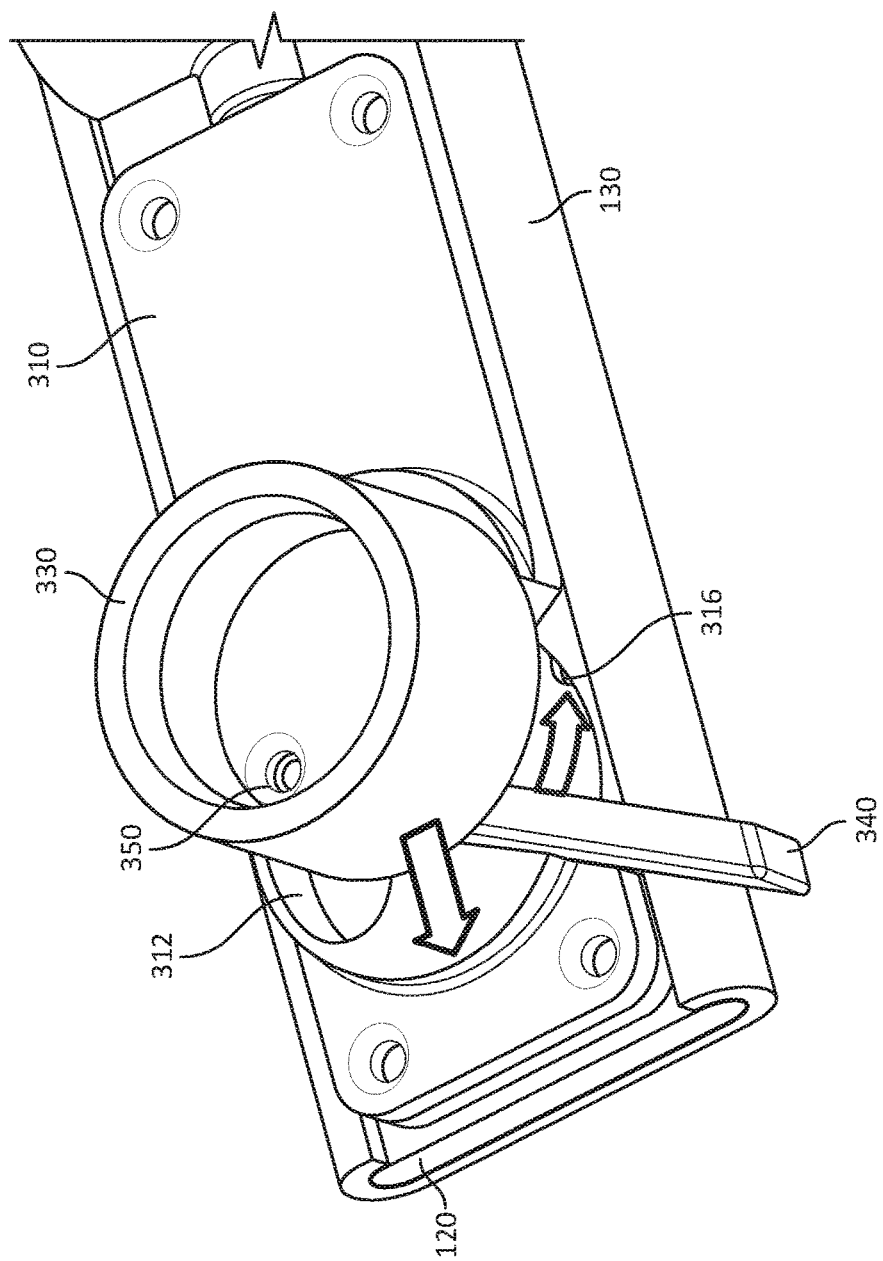
FIG. 6 is a close-up view of a micro-adjustment apparatus.

Base 310 may include an additional aperture 410, as shown in FIG. 4, to help guide knob 330 as knob 330 rotates disk 320. Knob 330 may be coupled to a guide pin 420 that slides through aperture 410 as knob 330 and cam 350 move laterally (as shown in FIGS. 5 and 6).

FIGS. 3-6 show that graspable arm 340 may extend from and be coupled to a circumference 322 of disk 320. Graspable arm 340 may extend upward relative to a head-mounted display or downward relative to a head-mounted display (as shown in FIGS. 2 and 10-13). Graspable arm 340 may move in conjunction with disk 320 and knob 330. For example, graspable arm 340 may rotate within a triangular aperture 314 of base 310, and any rotation of graspable arm 340 may translate to rotational movement of disk 320 and lateral movement of knob 330. As discussed in greater detail in connection with FIG. 13, the configuration of knob 330 and graspable arm 340 may facilitate making quick, comfortable micro adjustments to a head-mounted-display strap system. For example, a user may rotate graspable arm 340 to cause knob 330 (and head-mounted display 210) to move forward or backward relative to track 140 and strap 150. As a result, rotation of graspable arm 340 may extend or shorten strap 150 relative to head-mounted display 210, causing head-mounted display 210 to fit more tightly or more loosely against a user's face. Micro-adjustments provided by micro-adjustment actuator 300 may provide additional extension (e.g., 1 mm to 30 mm) of strap 150 beyond any extension provided by the macro-adjustments enabled by spring 110. These micro adjustments may be incremental adjustments (e.g., increments of one mm, two mm, three mm, four mm, five mm etc.) or may be continuous adjustments.

Figure 7:
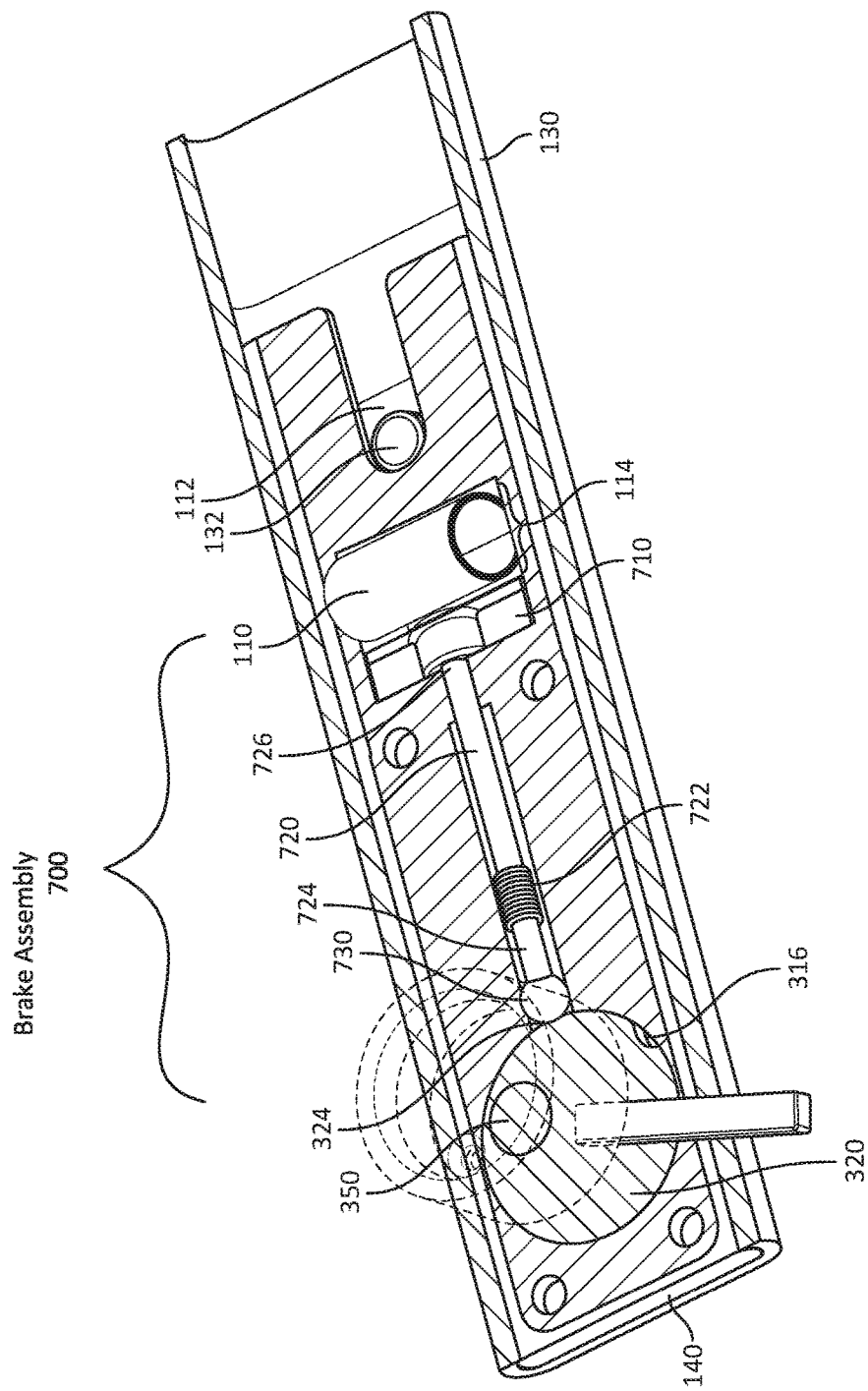
FIG. 7 is a cross-sectional view of a micro-adjustment assembly for a strap-adjustment apparatus.
Figure 8:
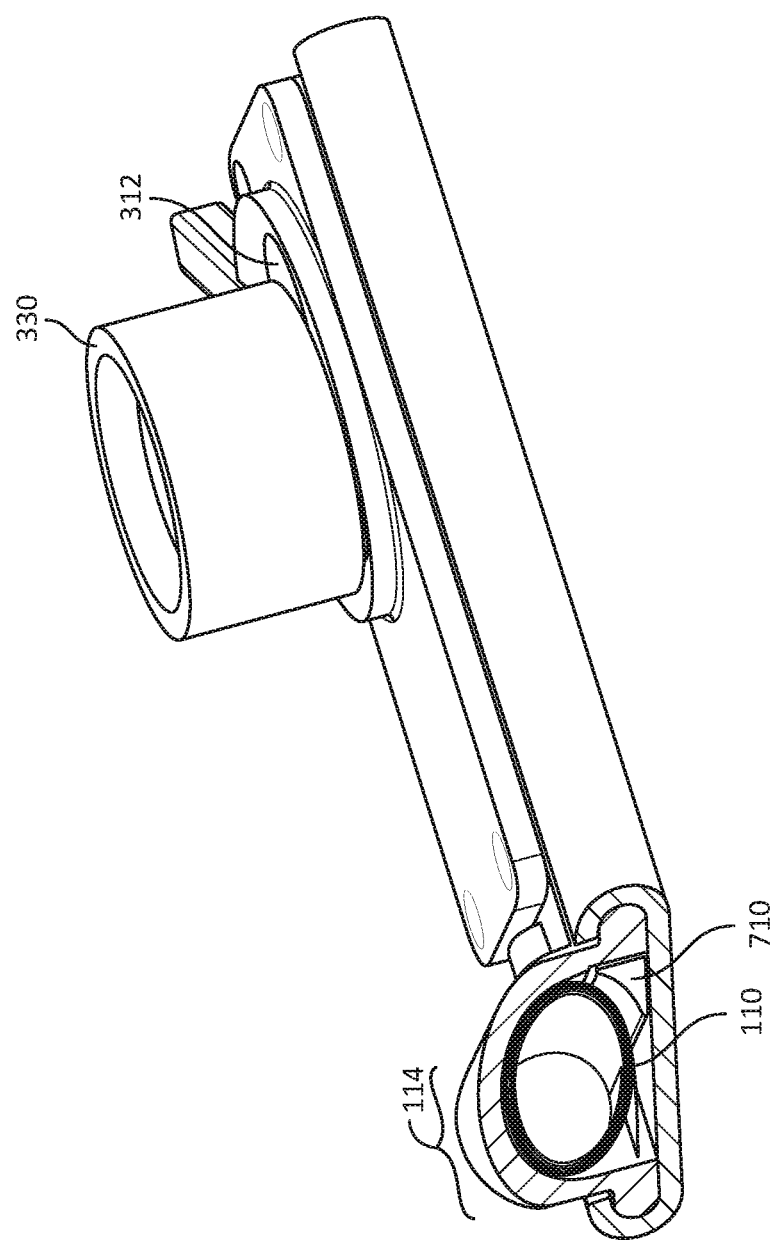
FIG. 8 is a cross-sectional view of a ribbon spring within a housing of a strap-adjustment apparatus.

As noted, micro-adjustment actuator 300 may actuate a brake assembly, such as brake assembly 700 shown in FIGS. 7 and 8. Brake assembly 700 may include a brake 710 that may be positioned to apply pressure to spring 110 in a manner that creates resistance to deflection (e.g., rolling and unrolling) of spring 110. Brake 710 may be coupled to disk 320 via a shaft 720 and/or a bearing 730. As shown, shaft 720 may be spring loaded by a spring 722 (e.g., a compression or extension spring) that biases shaft 720 toward disk 320. Spring-loaded shaft 720 may have a proximal end 724 that is coupled to disk 320 via bearing 730. Spring-loaded shaft 720 may also have a distal end 726 that is coupled to brake 710.

Disk 320 may be dimensioned such that, when in a first rotary position (e.g., any position where a circumference 322 of disk 320 engages bearing 730), brake 710 may press against spring 110 and increase the resistance to the deflection of spring 110 (e.g., by increasing from no resistance to some resistance or by increasing from some resistance to greater resistance). In other words, when disk 320 is in the first rotary position (i.e., the position shown in FIG. 7), an arc section 324 of disk 320 may push shaft 720 toward spring 110 and cause brake 710 to increase resistance to the deflection of spring 110. Alternatively, when disk 320 is rotated to a second rotary position (e.g., a position where aperture 312 of disk 320 receives or catches bearing 730), brake assembly 700 may, as a result of the bias of spring 722, release some or all resistance that was being applied to spring 110 when disk 320 was in the first rotary position. In other words, when disk 320 is in the second rotary position, a recessed area 316 of disk 320 may allow shaft 720 to move away from spring 110, thereby causing brake 710 to decrease or release resistance against spring 110.

While FIG. 7 shows a single recessed area 316 within disk 320, disk 320 may be configured with any suitable number of detents or recesses of different shapes and sizes to facilitate multiple levels of adjustment to how hard brake 710 presses against spring 110 and/or to facilitate multiple discrete micro adjustments to a strap's extension.

Figure 9:
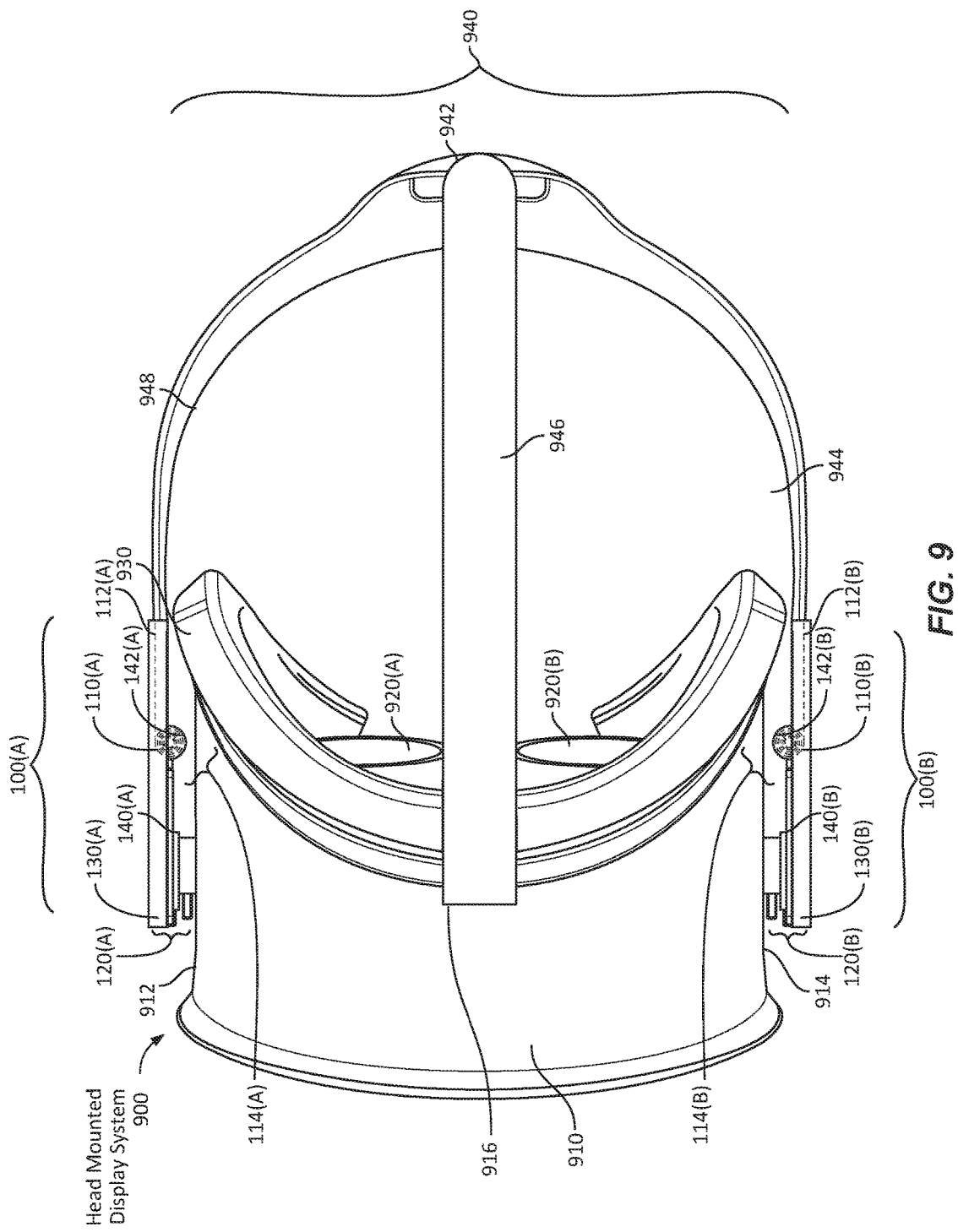
FIG. 9 is a top view of multiple strap-adjustment devices coupled to a head-mounted display.

The strap-adjustment devices shown in FIGS. 3-8 may be part of a head-mounted-display system, as shown in FIGS. 9-13. FIG. 9 is a top view of head-mounted-display system 900 that includes two instances of strap-adjustment apparatus 100, which are referenced in FIG. 9 as 100(A) and 100(B). As shown in FIG. 9, strap-adjustment apparatus 100(A) may be mounted on a right side 912 of a head-mounted display 910 in a location that positions strap-adjustment apparatus 100(A) near a user's right temple when the user wears head-mounted-display 910. Similarly, strap-adjustment apparatus 100(B) may be mounted on a left side 914 of head-mounted-display 910 in a location that positions strap-adjustment apparatus 100(B) near a user's left temple when the user wears head-mounted display 910.

Figure 10:
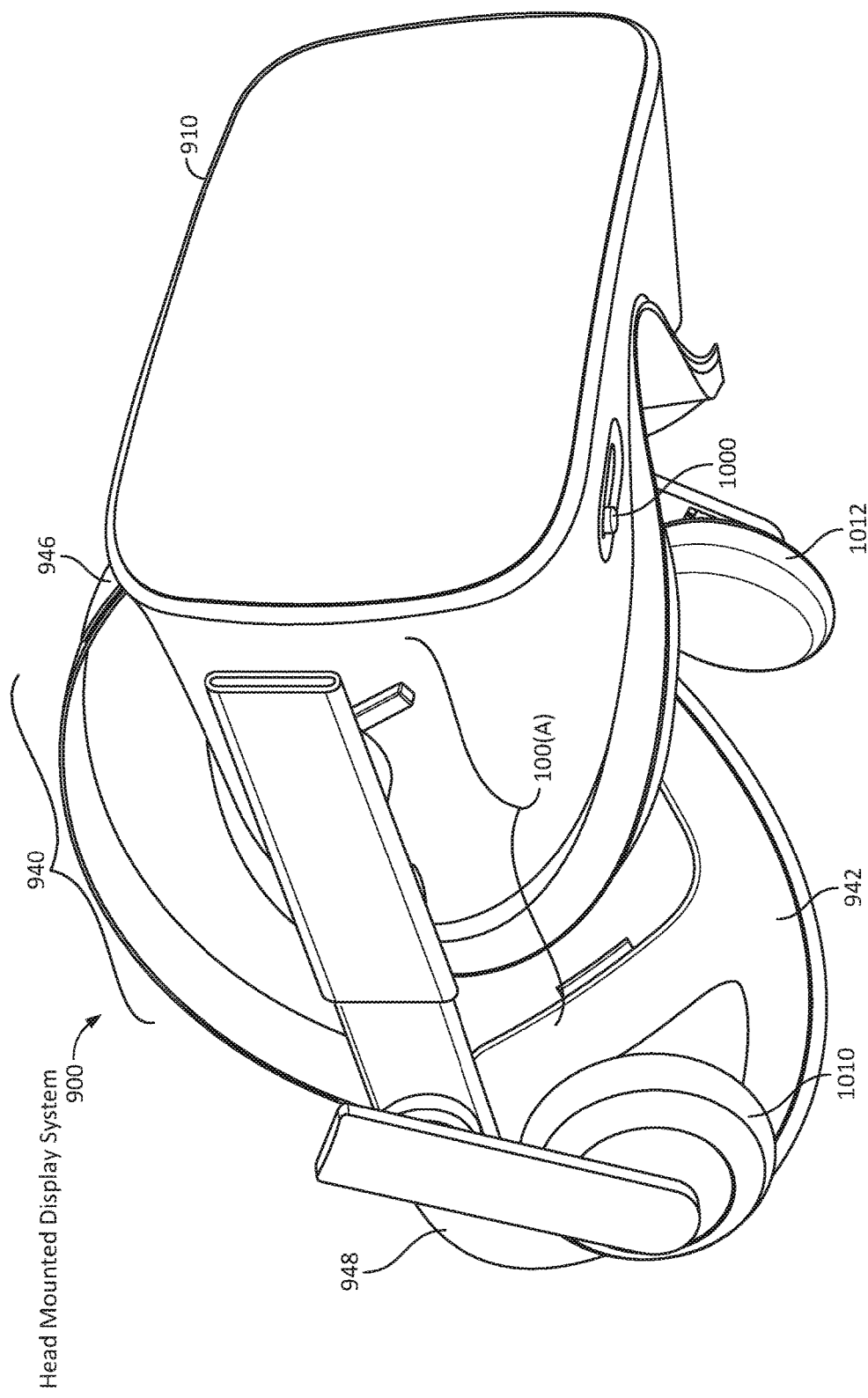
FIG. 10 is a perspective view of a head-mounted display with audio components that are coupled to strap-adjustment devices.

FIGS. 9 and 10 also show various additional elements that may be included in head-mounted-display system 900. For example, head-mounted-display 910 may include display optics 920(A-B) and a facial-interface system 930 (e.g., a cushion). Head-mounted display 910 may also be coupled to a strap system 940, which may include a back section 942 that forms a coupling point for a left side section 944, a top section 946, and a right-side section 948. Left-side section 944 of strap system 940 may be coupled to strap-adjustment apparatus 100(B), right-side section 948 may be coupled to strap-adjustment apparatus 100(A), and top section 946 may be coupled to a top portion or area 916 of head-mounted display 910. Furthermore, as shown in FIG. 10 (a perspective view of head-mounted-display system 900), head-mounted display 910 may include a slider 1000 that may adjust a position and/or focus of optics 920(A) and 920(B). Also, as shown in FIG. 10, head-mounted-display system 900 may include an audio system with headphones 1010 and 1012 that are coupled to strap-adjustment apparatus 100(A) and apparatus 100(B), respectively.

Figure 11:
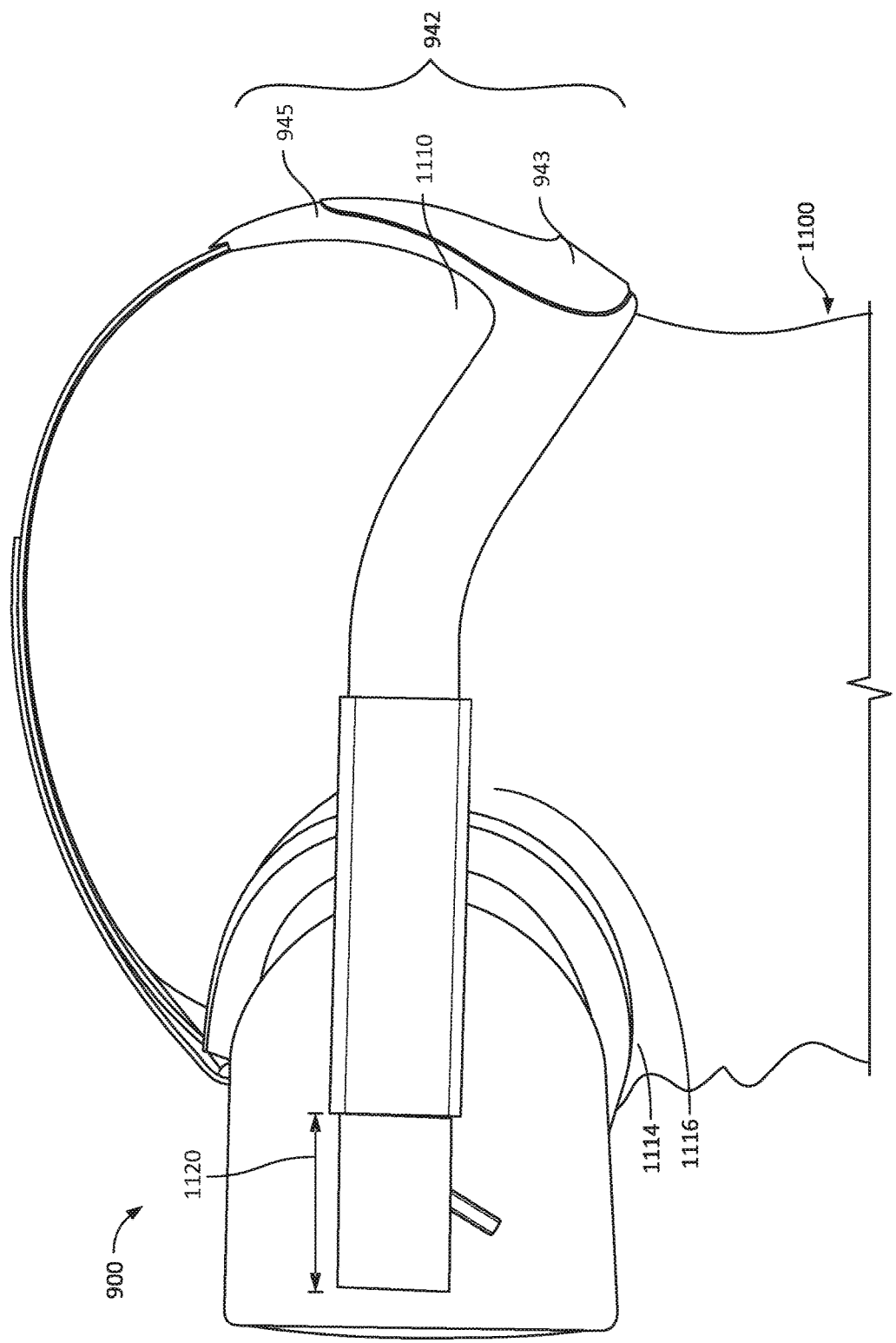
FIG. 11 is a side view of a head-mounted-display system positioned on a user's head.
Figure 12:
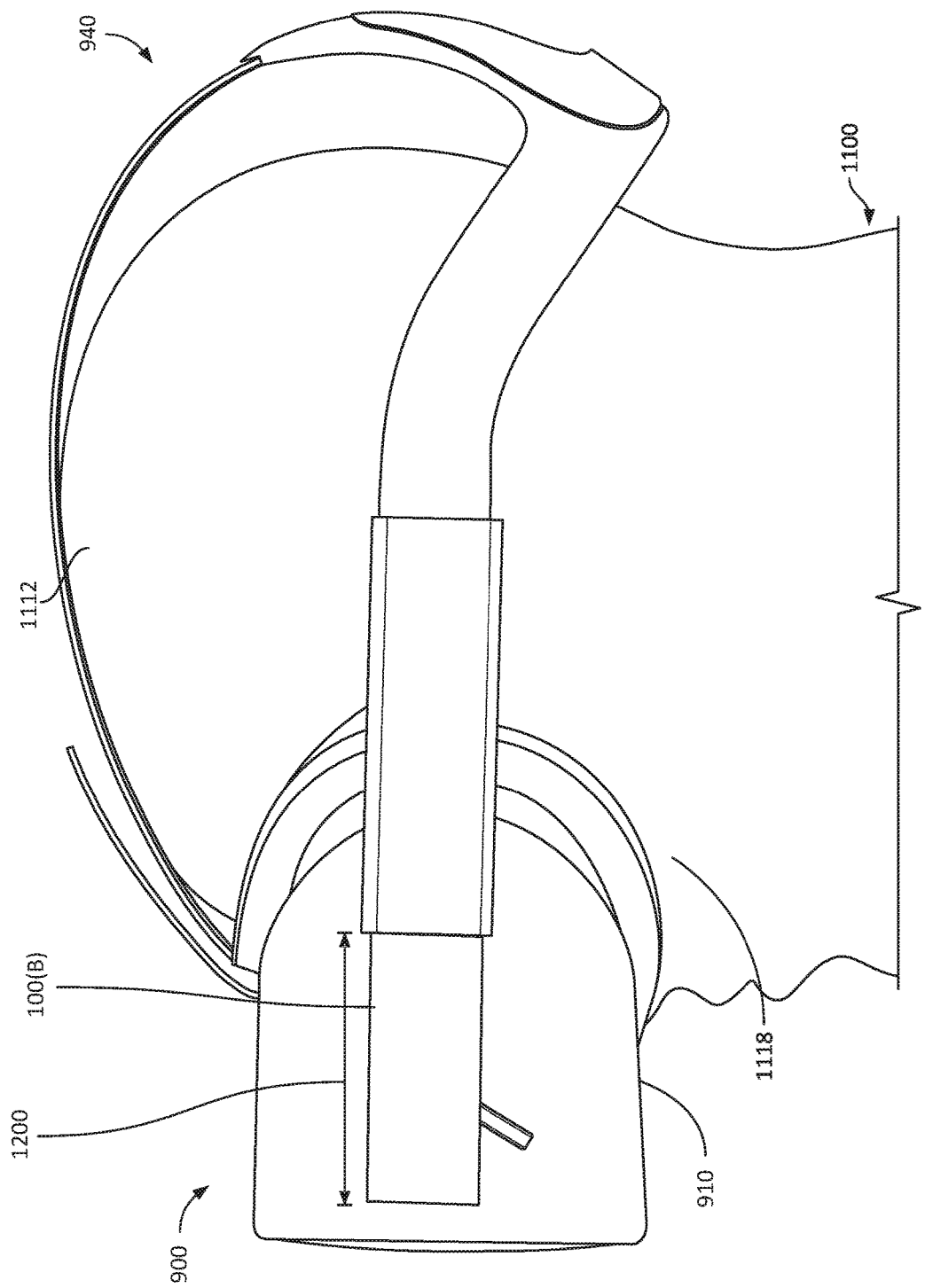
FIG. 12 is a side view of the head-mounted-display system of FIG. 11 with a strap system that is extended via strap-adjustment devices.
Figure 13:
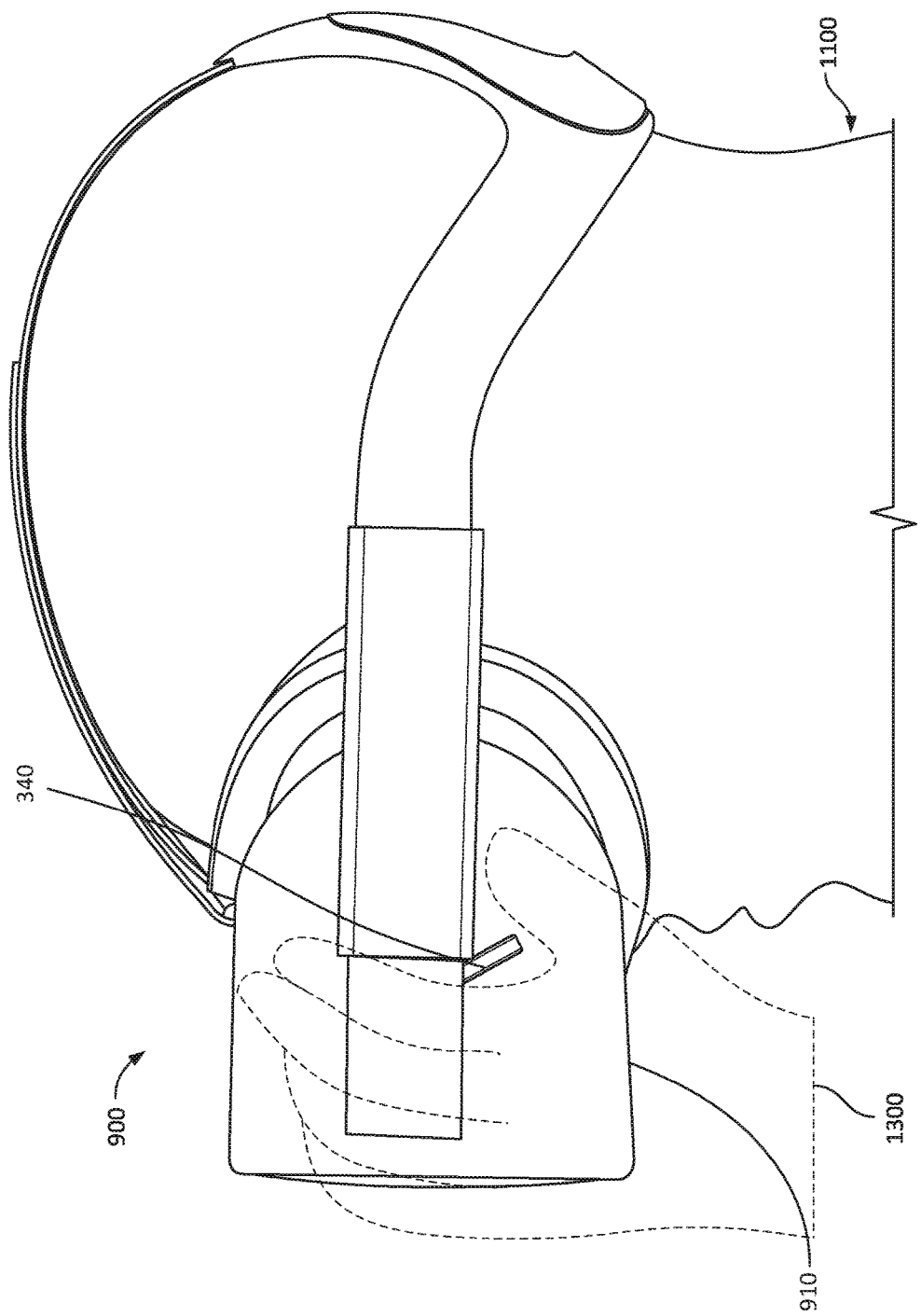
FIG. 13 illustrates a user making micro-adjustments to the head-mounted-display system of FIG. 11.

FIGS. 11-13 show examples of how a user may wear and adjust head-mounted-display system 900. A user may place head-mounted-display system 900 on their head 1100, which may cause strap-adjustment apparatus 100(B) to extend by a travel distance 1120, as shown in FIG. 11. While the user is wearing head-mounted-display system 900, back section 942 of strap system 940 may include a lower region 943 that conforms to a region of user's head 1100 below the user's occipital lobe 1110 (i.e., below the user's occipital protuberance). In some embodiments, back section 942 of strap system 940 may include an upper region 945 that conforms to an upper-back region of user's head 1100 above occipital lobe 1110. Upper region 945 of back section 942 may coordinate with one or more other sections of strap system 940 to balance and stabilize head-mounted-display system 900 on user's head 1100. Additionally, strap system 940 may allow minimum or no weight bearing on a user's cheek 1114 or nose 1116 when head-mounted-display system 900 is on user's head 1100. Therefore, unlike the straps for ski goggles, which may rely on friction between the straps and the user's head and the friction between the goggles and the user's face to hold and balance the weight of the goggles, the flexible strap systems discussed in the present disclosure provide a much-improved user experience.

FIG. 12 shows strap system 940 extended behind user's head 1100, thereby enabling convenient removal or securing of head-mounted-display system 900 to user's head 1100. While FIG. 12 shows strap system 940 being pulled back away from user's head 1100 with head-mounted display 910 remaining against a user's face 1118, head-mounted display 910 may additionally or alternatively be pulled away from user's face 1118 when the user is putting on or removing head-mounted display 910. Further, by enabling strap system 940 to move by travel distance 1200 (or further), strap-adjustment apparatus 100(B) may enable head-mounted-display system 900 to be sized for various user's heads.

In examples where spring 110 is a constant-force spring, the force applied by spring 110(B) may be similar when strap-adjustment apparatus 100(B) is extended by a relatively short distance 1120 (e.g., when head-mounted-display system 900 is being worn as shown in FIG. 11) as when strap-adjustment apparatus 100(B) is extended by a relatively long distance 1200 (e.g., when a user is making macro adjustments to head-mounted-display system 900, as shown in FIG. 12).

Turning to FIG. 13, a user wearing head-mounted-display system 900 may make micro adjustments to the fit of head-mounted-display system 900 while the user is wearing head-mounted-display system 900. A user's hand 1300 may push backward on grippable arm 340, causing knob 330 to move track 140 backwards relative to the user's face, thereby providing a micro-adjustment that loosens the fit of head-mounted-display system 900. Alternatively, user's hand 1300 may pull forward on grippable arm 340, causing knob 330 to move track 140 forward relative to the user's face, thereby providing a micro-adjustment that tightens the fit of head-mounted-display system 900.

Similarly, user's hand 1300 may push backward on grippable arm 340 to cause brake 710 to lock spring 110(B). Alternatively, user's hand 1300 may pull forward on grippable arm 340 to cause brake 710 to disengage from spring 110(B). By locking spring 110 from moving, the user may lock in any adjustments made to a fit of head-mounted-display system 900, such as pulling head-mounted display 910 away from their face to loosen the fit or pushing head-mounted display 910 more securely against their face to tighten the fit.

Figure 14:
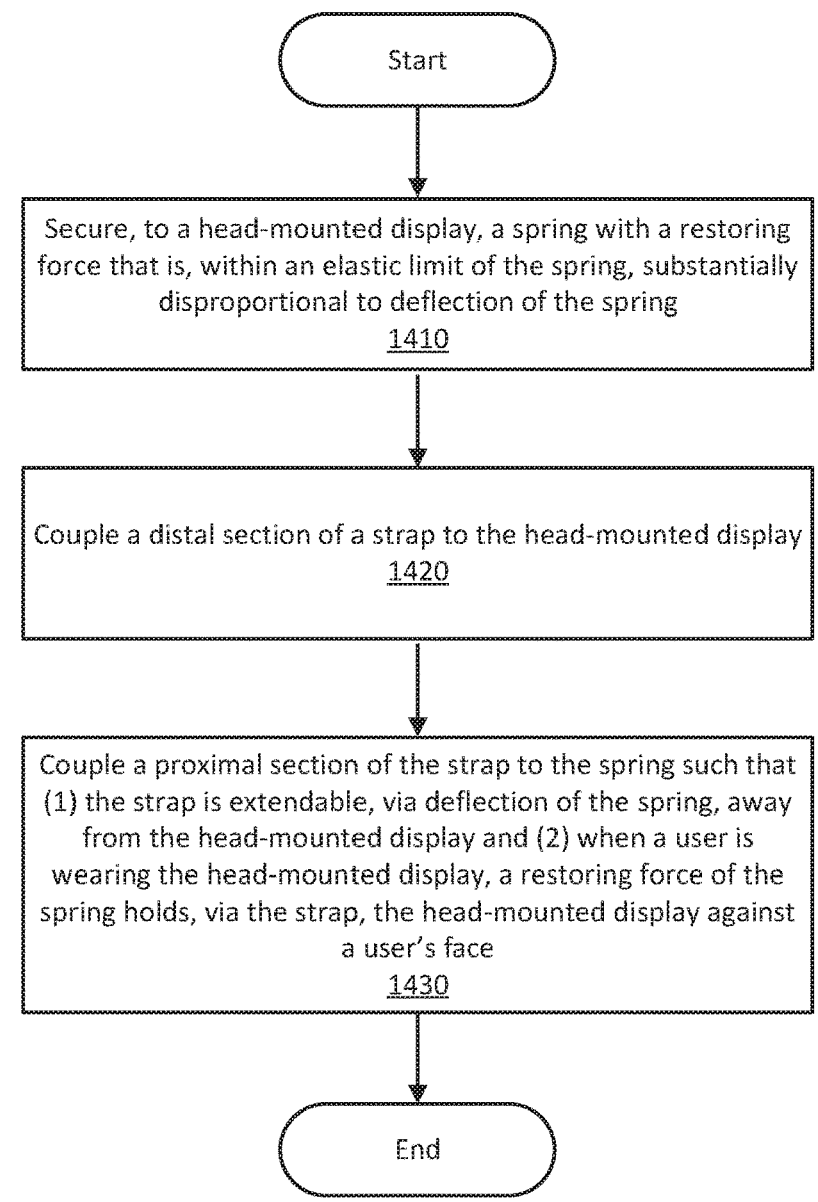
FIG. 14 is a flow diagram of a method for assembling a strap-adjustment apparatus with a non-Hooke's-law spring.
Figure 15:
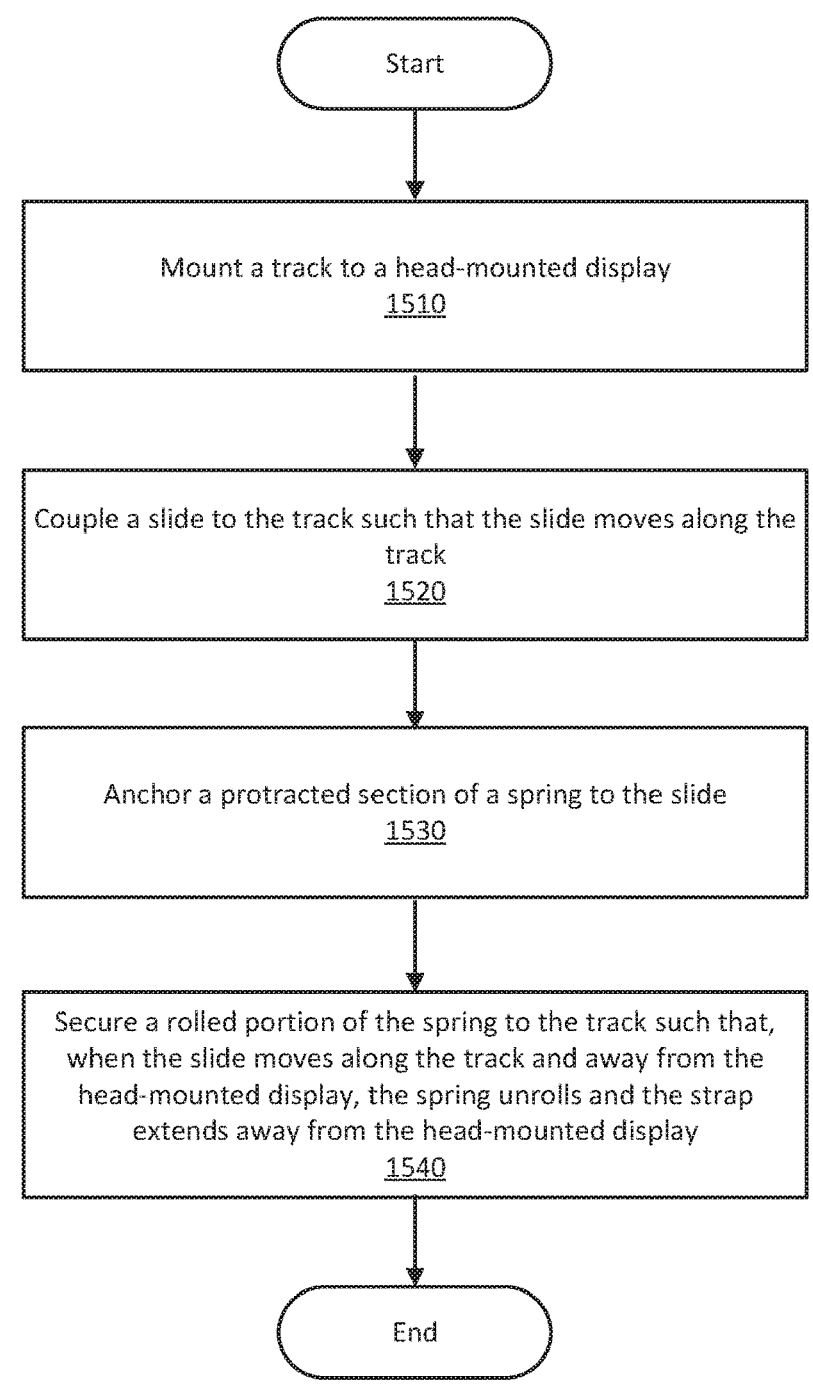
FIG. 15 is a flow diagram of a method for coupling a ribbon spring to a head-mounted display.
Figure 16:
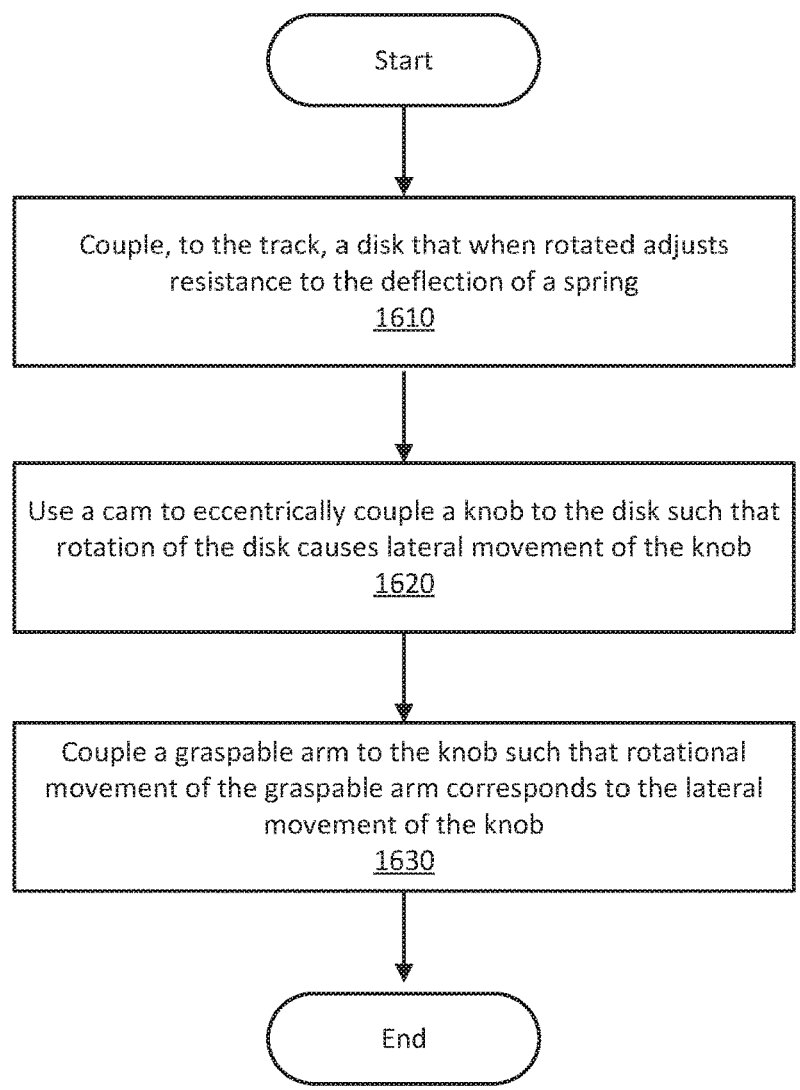
FIG. 16 is a flow diagram of a method for assembling a micro-adjustment apparatus on a strap-adjustment device.

FIGS. 14-16 show exemplary methods for manufacturing, assembling, using, adjusting, or otherwise configuring or creating the systems and devices presented herein. FIG. 14 is a flow diagram of an exemplary method 1400 for assembling a strap-adjustment apparatus per embodiments disclosed herein, FIG. 15 is a flow diagram of an exemplary method for securing a strap-adjustment apparatus to a head-mounted display, and FIG. 16 is a flow diagram of an exemplary method for coupling a micro-adjustment assembly to a strap-adjustment apparatus. The steps shown in FIGS. 14-16 may be performed by any individual and/or by any suitable type or form of manual and/or automated apparatus.

As shown in FIG. 14, at step 1410 a spring may be secured to a head-mounted display, and the spring may have a restoring force that is, within an elastic limit of the spring, substantially disproportional to deflection of the spring. For example, as shown in FIG. 9, spring 110(A) may be positioned within housing 142(A) of mount 120(A), and mount 120(A) may be secured to head-mounted display 910 at side 912. Thus, spring 110(A) may be secured to head-mounted display 910 via mount 120(A), which may be attached directly (or indirectly) to head-mounted display 910 (the description corresponding to FIG. 15 discusses this assembly process in greater detail). In some embodiments, mount 120(A) may be attached to head-mounted display 910 in a rotatable manner to enable mount 120(A) and spring 110(A) to rotate up and down relative to head-mounted display 910 to accommodate various users' head sizes and fitting preferences.

At step 1420, a distal section of a strap may be coupled to the head-mounted display. For example, as shown in FIG. 9, a distal section of strap system 940 (e.g., left-side section 944) may be coupled to head-mounted display 910, either via a direct connection or an indirect connection (e.g., via strap-adjustment apparatus 100(B)). In such embodiments, the distal section of strap system 940 may be attached to spring 110(B) via housing 142(B) of track 140(B) (e.g., housing 142(B) may house rolled portion 114(B) of spring 110(B)). A protracted section 112(B) of spring 110(B) may be attached to slide 130(B), which may move along track 140(B). In this example, spring 110(B) may have a restoring force that is within an elastic limit of spring 110(B), and mount 120(B) may be rotatably secured to head-mounted display 910.

At step 1430, a proximal section of the strap may be coupled to the spring such that (1) the strap is extendable, via deflection of the spring, away from the head-mounted display and (2) when a user is wearing the head-mounted display, a restoring force of the spring holds, via the strap, the head-mounted display against the user's face. For example, proximal section 948 of strap system 940 may be connected to track 140(A). In this configuration, proximal section 948 of strap system 940 may extend toward a back of a user's head when rolled portion 114(A) of spring 110(A) unrolls and allows slide 130(A) to slide backwards relative to track 140(A).

Turning to FIG. 15, exemplary method 1500 may include steps for securing a spring to a head-mounted display. The steps in FIG. 15 may be sub-steps of step 1410 and may show one of many ways in which step 1410 may be performed.

At step 1510, a track may be mounted to a head-mounted display. For example, as shown in FIG. 9, track 140(A) may be mounted to a side 912 of head-mounted display 910. Track 140(A) may be mounted to head-mounted display 910 with a movable attachment mechanism such a swivel, a hinge, a ball and socket, and/or any other type or form of pivoting or rotating attachment (e.g., via knob 330). Alternatively, track 140(A) may be mounted to head-mounted display 910 via a fixed coupling mechanism. For example, track 140(A) may be formed as an integral part of display 910 and/or may be attached with a non-movable attachment mechanism (e.g., a fastener, an adhesive, etc.).

At step 1520, a slide may be coupled to the track such that the slide moves along the track. For example, as shown in FIG. 9, slide 130(A) may be movably coupled to track 140(A). Slide 130(A) may be coupled to track 140(A) in any suitable manner. For example, track 140(A) may be inserted into slide 130(A), and slide 130(A) may include a catch that prevents track 140(A) from decoupling from slide 130(A). In some embodiments, the catch may be configured to allow slide 130(A), along with strap system 940, to be detached from track 140(A). A user may detach strap system 940 from track 140(A) to decouple strap system 940 from head-mounted display 910 (e.g., to allow easier cleaning of strap system 940 or head-mounted-display system 900, to allow strap system 940 to be swapped with a different strap system, etc.).

At step 1530, a protracted section of a spring may be anchored to the slide. For example, as shown in FIG. 9, protracted section 112(A) of spring 110(A) may be anchored to slide 130(A). Protracted section 112(A) of spring 110(A) may be anchored to slide 130(A) in any suitable manner. In some embodiments, protracted section 112(A) of spring 110(A) may be anchored to slide 130(A) via a catch (e.g., post 132) in slide 130(A). Additionally or alternatively, protracted section 112(A) of spring 110(A) may be anchored to slide 130(A) via a fastener and/or an adhesive.

At step 1540, a rolled portion of the spring may be secured to the track such that, when the slide moves along the track and away from the head-mounted display, the spring unrolls and the strap extends away from the head-mounted display. For example, as shown in FIG. 9, rolled portion 114(A) of spring 110(A) may be positioned inside housing 142(A) of track 140(A). Thus, when a user pulls strap system 940 away from head-mounted display 910, spring 110(A) may extend (e.g., unroll) to allow track 140(A), along with proximal section 948, to move backwards relative to slide 130(A).

While the steps of FIG. 15 have been discussed using an example of how spring 110(A) may be coupled to head-mounted display 910, the steps discussed in FIG. 15 may also be implemented to couple spring 110(B) to head-mounted display 910.

FIG. 16 is a flow diagram of an exemplary method 1600 for coupling a micro-adjustment assembly to a strap-adjustment mechanism. As shown in FIG. 16, at step 1610 a disk may be coupled to a track of a strap-adjustment mechanism such that, when the disk is rotated, the disk adjusts deflection resistance of a spring in the strap-adjustment mechanism. For example, as shown in FIGS. 3 and 5, disk 320 may be positioned within a cylindrical recess in track 140. Disk 320 may also be coupled to track 140 in any other suitable manner.

At step 1620 in FIG. 16, a cam may be used to eccentrically couple a knob to the disk such rotation of the disk causes lateral movement of the knob. For example, as shown in FIGS. 3-7, a lower portion of cam 350 may be inserted into a cylindrical opening in disk 320. Similarly, knob 330 may be eccentrically positioned over disk 320 such that a cylindrical opening in knob 330 receives an upper portion of cam 350. In other embodiments, cam 350 may be formed as an integral part of disk 320, knob 330, or both (e.g., disk 320, cam 350, and knob 330 may be manufactured or assembled as a single integral part).

At step 1630 in FIG. 16, a graspable arm may be coupled to the knob such that rotational movement of the graspable arm corresponds to lateral movement of the knob. For example, as shown in FIGS. 3-7, graspable arm 340 may be coupled to knob 330 via disk 320 and cam 350. In this example, graspable arm 340 may be manufactured or assembled as an integral part of disk 320. Additionally or alternatively, graspable arm 340 may be a separate component that is attached to disk 320 and/or knob 330. As another example, graspable arm 340 may be formed as an integral part of knob 330. As noted above, graspable arm 340 and/or knob 330 may enable micro-adjustments of strap-adjustment apparatus 100.

The process parameters and sequence of the steps described and/or illustrated in FIGS. 14-16 are given by way of example only and can be varied as desired. For example, while the steps illustrated and/or described herein may be shown or discussed in a particular order, these steps do not necessarily need to be performed in the order illustrated or discussed to assemble, manufacture, or use strap-adjustment apparatus 100. The various exemplary methods described and/or illustrated in FIGS. 14-16 may also omit one or more of the steps described or illustrated herein or include additional steps in addition to those disclosed.

As discussed throughout the instant disclosure, the disclosed methods, systems, and devices may provide one or more advantages over traditional headset fitting mechanisms. For example, the strap-adjustment devices described herein may provide increased strap adjustment ranges relative to other types of adjustment systems. As a result, these strap-adjustment devices may comfortably accommodate a wider range of head sizes than other systems. As another example, by using constant-force springs to enable strap extension, the systems described herein may eliminate some (or all) of the manual adjustments that may have been needed to properly fit a traditional head-mounted display. Thus, switching a headset between multiple users may be much less cumbersome and time-consuming. Furthermore, some of the devices discussed herein may enable a user to make micro adjustments while using a head-mounted display, thereby allowing the user to stay immersed in a virtual- or augmented-reality experience without discomfort or distraction. In general, the systems disclosed herein may improve immersion and/or enjoyment of using a head-mounted display, making virtual- and augmented-reality experiences more fulfilling or useful.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, thereby enabling others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various embodiments described herein is for the purpose of explaining particular embodiments only and is not intended to be limiting. As used in the discussion of the various highlighted embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A head-mounted-display adjustment apparatus comprising:
    a spring with a restoring force that is, within an elastic limit of the spring, substantially disproportional to deflection of the spring;
    a mount that couples the spring to a head-mounted display; and
    a strap comprising a distal section coupled to the head-mounted display and a proximal section coupled to the spring such that:
        the strap is extendable, via deflection of the spring, away from the head-mounted display, and
        when a user is wearing the head-mounted display, the restoring force of the spring holds, via the strap, the head-mounted display against the user's face.

2. The head-mounted-display adjustment apparatus of claim 1, wherein the restoring force of the spring is at least approximately constant over a working deflection of the spring.

3. The head-mounted-display adjustment apparatus of claim 1, wherein:
    the mount comprises a telescoping assembly comprising
        a track that is connected to the head-mounted display; and
        a slide that moves along the track and is connected to the proximal section of the strap;
    the spring comprises a ribbon comprising a rolled portion and a protracted section that extends from the rolled portion;
    the protracted section of the ribbon is anchored to the slide; and
    the rolled portion of the ribbon is housed by the track such that, when the slide moves along the track and away from the head-mounted display, the ribbon unrolls and the strap extends away from the head-mounted display.

4. The head-mounted-display adjustment apparatus of claim 1, further comprising an actuator that controls resistance to the deflection of the spring.

5. The head-mounted-display adjustment apparatus of claim 4, wherein the actuator comprises:
    a disk that, when rotated, adjusts the resistance to the deflection of the spring;
    a knob that couples the mount to the head-mounted display; and
    a cam that couples the knob to the disk in an eccentric manner such that rotation of the disk causes lateral movement of the knob.

6. The head-mounted-display adjustment apparatus of claim 5, wherein:
    the actuator comprises a graspable arm extending from and coupled to a circumference of the disk; and
    the graspable arm, when rotated toward or away from the head-mounted display, rotates the disk.

7. The head-mounted-display adjustment apparatus of claim 5, further comprising a brake assembly coupled to the disk, wherein:
    the disk is dimensioned to, when in a first rotary position, cause the brake assembly to increase the resistance to the deflection of the spring; and
    the disk is dimensioned to, when in a second rotary position, cause the brake assembly to decrease the resistance to the deflection of the spring.

8. The head-mounted-display adjustment apparatus of claim 7, wherein the brake assembly comprises:
    a brake positioned to apply pressure to the spring in a manner that creates the resistance to the deflection of the spring; and
    a spring-loaded shaft comprising a proximal end coupled to the disk and a distal end coupled to the brake, wherein:
        a circumference of the disk comprises an arc section and a recessed section,
        when the disk is in the first rotary position, the arc section of the disk pushes the spring-loaded shaft toward the spring and causes the brake assembly to increase the resistance to the deflection of the spring, and
        when the disk is in the second rotary position, the recessed section of the disk allows the spring-loaded shaft to move away from the spring and cause the brake assembly to decrease the resistance to the deflection of the spring.

9. The head-mounted-display adjustment apparatus of claim 8, further comprising a bearing that couples the proximal end of the spring-loaded shaft to the disk.

10. A head-mounted-display system comprising:
    a spring with a restoring force that is, within an elastic limit of the spring, substantially disproportional to deflection of the spring;
    a head-mounted display;
    a mount that couples the spring to the head-mounted display; and
    a strap comprising a distal section coupled to the head-mounted display and a proximal section coupled to the spring such that:
        the strap is extendable, via deflection of the spring, away from the head-mounted display, and
        when a user is wearing the head-mounted display, the restoring force of the spring holds, via the strap, the head-mounted display against the user's face.

11. The head-mounted-display system of claim 10, wherein the distal section of the strap is coupled to the head-mounted display via an additional mount that couples an additional spring to the head-mounted display.

12. The head-mounted-display system of claim 11, wherein:
the spring comprises a constant-force spring;
the additional spring comprises a constant-force spring; and
a tension of the spring at least approximates a tension of the additional spring.

13. The head-mounted-display system of claim 12, wherein:
the mount is connected to a first section of the head-mounted display that is dimensioned to be positioned at a left side of the user's head; and
the additional mount is connected to a second section of the head-mounted display that is dimensioned to be positioned at a right side of the user's head.

14. The head-mounted-display system of claim 13, wherein the strap comprises a medial section coupled to a third section of the head-mounted display that is dimensioned to be positioned at a forehead of the user.

15. The head-mounted-display system of claim 10, wherein the mount comprises:
a disk that, when rotated, adjusts resistance to the deflection of the spring;
a knob that couples the mount to the head-mounted display; and
a cam that couples the knob to the disk in an eccentric manner such that rotation of the disk causes lateral movement of the knob.

16. The head-mounted-display system of claim 10, wherein:
the mount comprises a telescoping assembly comprising:
a track that is connected to the head-mounted display; and
a slide that moves along the track and is connected to the proximal section of the strap;
the spring comprises a ribbon comprising a rolled portion and a protracted section that extends from the rolled portion;
the protracted section of the ribbon is anchored to the slide; and
the rolled portion of the ribbon is housed by the track such that, when the slide moves along the track and away from the head-mounted display, the ribbon unrolls and the strap extends away from the head-mounted display.

* * * * *